United States Patent Office 3,258,049
Patented June 28, 1966

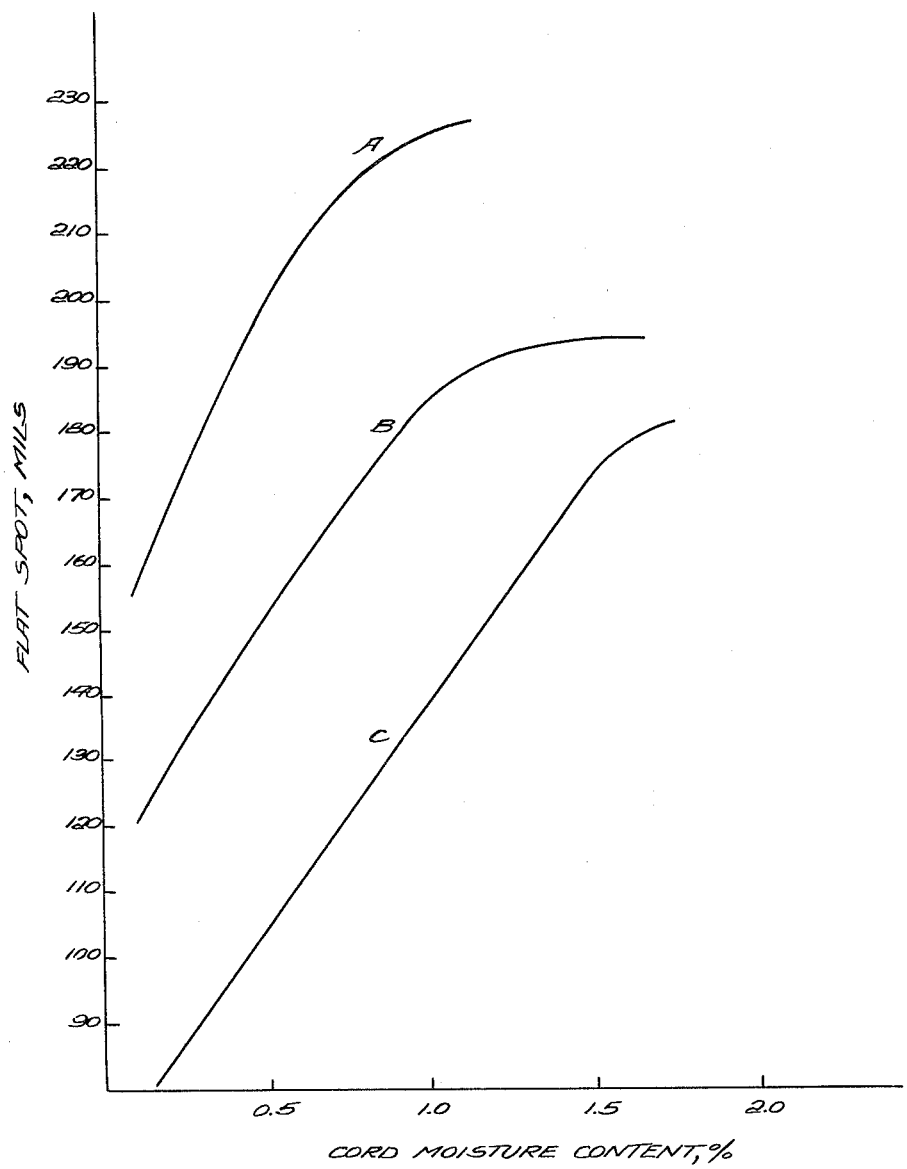

3,258,049
PNEUMATIC TIRE WITH MOISTURE BARRIER
Lavern James Ahles and Yathiraja Iyengar, both of Wilmington, Del., assignors to E. I. du Pont de Nemours and Company, Wilmington, Del., a corporation of Delaware
Filed Apr. 27, 1964, Ser. No. 363,009
6 Claims. (Cl. 152—330)

This is a continuation-in-part of our copending application Serial No. 160,287, filed December 18, 1961, now abandoned. The invention relates generally to pneumatic tires and, more particularly, to a nylon-reinforced tire with substantially reduced "flat-spotting" properties.

Nylon tire cords owe their widespread acceptance to the superior service they give under heavy loads, at high speeds, and to their bruise and impact resistance. However, conventionally fabricated tires reinforced with nylon cords often exhibit a temporary phenomenon known as "flat-spotting," i.e., a flatness develops on the tire surface in contact with the road as the tire cools after use. When the tire is again placed in use, this flatness persists temporarily and a thumping sound is audible. This phenomenon has been attributed, at least in part, to such visco-elastic properties as the relatively low dimensional stability, low modulus, and high growth of conventional polyamide yarns.

It has long been recognized that any appreciable reduction in flat-spot depth would remove the principal objection to the otherwise highly advantageous use of nylon in tire reinforcement cords. The present invention is based on the discovery that flat-spotting of a tire having nylon cords is related to the presence of moisture in the cords.

This invention has as its most important objective the provision of a tire reinforced with nylon cords, which cords have an unusually low moisture content. Such a tire has substantially reduced flat-spotting properties.

A further object is to provide moisture barriers surrounding the cords in order to insure that they will remain substantially dry after the tire has been built and placed in use.

A still further objective of the present invention is to provide improvements in the procedures followed in the preparation and fabrication of such a tire.

These and other objectives are accomplished in a tire reinforced with cords fabricated from nylon filaments which cords have a moisture content of less than 1.0% by weight. In addition, suitable barriers are provided in the tire for preventing the subsequent accumulation of moisture in the cords.

Unusually low moisture content of the cords is achieved by dispersing from 3–15% by weight of calcium oxide in the skim and/or liner stock and then fabricating the tire under relatively dry conditions, e.g., in an atmosphere having a relative humidity of 20% or less at 75° F. or the corresponding absolute humidity for other temperatures. Where the term "skim stock" is used herein, reference is made to the compounded material used in the preparation of reinforcement plies. Similarly, liner stock is the compounded material from which the inner liners are fabricated.

For best results, only dry air should be fed to the oven in which the cords are hot-stretched before preparation of the reinforcement fabric. The reinforcement fabric should be kept dry and re-dried if necessary. The skim and tread stock should contain no more than 0.25% moisture and should be kept in a wrapping of polyethylene, cellophane or other moisture-proof material until ready for use. To achieve the maximum benefit from these and other preliminary precautions, the green tire should be built and cured as soon as practicable after preparation of the cord fabric and in an atmosphere having a relative humidity at 75° F. of 20% or less.

As an additive or alternative moisture barrier, typical overlays which may be coated on the yarn to exclude moisture are formaldehyde (which cross-links on the filament surface), petroleum waxes, fluorohydrocarbons, vinyl resins, polyvinylidene chloride and acrylonitrile, and silicones such as chlorosilane. Proper precautions should be taken in using hazardous materials such as chlorosilane. These overlays may be applied by dipping, either as a solution or as a melt, during hot-stretching. However, melts should be used only where significant vaporization of the overlay does not occur.

The following examples illustrate some of the practices which may be employed either to remove moisture from, or to establish a moisture barrier for, tire cords made from nylon yarn. All tires described in the examples (except III and VII) are 8.50-14. Where flat-spot depth is reported, the value is obtained by measuring the unloaded out-of-roundness in mils of a tire heated to 170° F. Then the heated tire is loaded against a flat surface, with 90% of the maximum permissible load specified in the 1962 Tire and Rim Association (2001 First National Tower, Akron 8, Ohio) Yearbook, and allowed to cool for two hours. The out-of-roundness is measured again and corrected for the over-all shrinkage of the tire. The difference between the two values is the flat-spot depth. In actual practice, riding characteristics are acceptable with a flat-spot depth of less than 160 mils.

The preferred tire of this invention is reinforced with cords having a moisture content less than 0.5%. In the appended drawing, the relationship between flat-spot depth and cord moisture content for four-ply pneumatic tires reinforced with cords of 6 nylon (polycaproamide), of 66 nylon (polyhexamethylene adipamide), and of an 80/20 melt blend by weight of polyhexamethylene adipamide with polyhexamethylene isophthalamide (British specification No. 918,637) has been illustrated in graphs A, B, and C, respectively. Of the nylon cords comprehended by this invention, the preferred are fabricated from filaments spun from melt blends of polyhexamethylene adipamide (95–50%) with polyhexamethylene isophthalamide (5–50%), polyhexamethylene 5-t-butyl isophthalamide (5–50%) or a copolymer (5–50%) of hexamethylene 5-t-butyl isophthalamide and hexamethylene isophthalamide (1.5–30%).

In the following examples, which are given to illustrate the invention and are not intended to limit the scope in any way, useful tires with two-ply and four-ply constructions are described. Generally, in tires with acceptable flat-spots, a two-ply tire can tolerate a higher moisture content than a four-ply tire.

Example I

A four-ply tire reinforced with cords fabricated from filaments spun from an 80/20 melt blend by weight of polyhexamethylene adipamide with polyhexamethylene isophthalamide is built using skim and tread stock in which is dispersed a 3:1 suspension of calcium oxide in "Sundex 41," an aromatic processing oil consisting of a blend of high molecular weight petroleum fractions with asphaltum. The skim stock contains 14% by weight, and the tread stock 11% by weight, of the dispersion. All stock is calendered at 130° F. Both the materials and the green tire built therefrom are maintained under conditions of approximately 20% relative humidity at 75° F. The tire is cured in a conventional manner. Its flat-spot depth is 99 mils and, when dissected, the cords are found to contain about 0.4% moisture. A control tire fabricated under similar conditions except for the calcium oxide dispersion exhibits a flat-spot depth of 158 mils, which corresponds to a cord moisture content of about 1.3%. An otherwise identical test tire from elastomeric skim and tread stock of lower moisture content due to being calendered at approximately 190° F. exhibits a flat-spot depth of only 80 mils, which corresponds to a cord moisture content of only about 0.1%. This example illustrates not only the advantage of a calcium oxide moisture barrier but also the importance of using dry elastomer stocks.

*Example II*

A tire is built in a 20% relative humidity, 75° F. atmosphere, cured conventionally, and (except that no CaO is in the tread) is structurally identical to the test tire in Example I. This tire exhibits a flat-spot of 93 mils and, when dissected, the cords are found to contain about 0.3% moisture.

Another test tire is built in the same atmosphere and is structurally identical to the test tire in Example I except that 10.2% by weight of CaO is dispersed in the skim stock only, as a powder. This tire has a flat-spot of 99 mils and, when dissected, the cords are found to contain about 0.3% moisture.

From a comparison with Example I, it is apparent that CaO is not needed in the tread and can be used in either the powdered form or in the form of an oil suspension. Actually, tires with CaO in the tread have been found to have reduced tread durability.

*Example III*

A two-ply 7.50-14 tire reinforced with cords fabricated from filaments spun from an 80/20 melt blend by weight of polyhexamethylene adipamide with polyhexamethylene isophthalamide is built with an inner liner of natural/SBR/reclaimed stock in which is dispersed 12% by weight of powdered calcium oxide. Both the materials and the green tire built therefrom are maintained under conditions of approximately 5% relative humidity at 75° F. The tire is cured in a conventional manner. Its flat-spot depth is 80 mils and, when dissected, the cords are found to contain about 0.4% moisture. This example illustrates the unexpected utility from dispersing the CaO in the inner liner alone where it does not contact the cords at all. Therefore, it may be concluded that CaO in the inner liner acts as a most effective moisture barrier to keep the cords dry.

*Example IV*

Two tubeless four-ply tires reinforced with cords fabricated from filaments spun from an 80/20 melt blend by weight of polyhexamethylene adipamide with polyhexamethylene isophthalamide are constructed under conditions of 20% relative humidity at 75° F. Both tires are identical and are otherwise processed identically except that, in one instance, "Polymekon" (a wax compound derived from high melting microcrystalline petroleum waxes) is applied as an overlay to the greige cords before the adhesive dip is applied. The moisture content of the cords of the completed tire which is treated with this petroleum wax is 0.5% while the unwaxed cords have a moisture content of 1.0%. Both tires exhibit flat-spot depths of less than 160 mils. To test the effect of the wax overlays, one pint of water is placed inside of each tire. After 0.7 hour exercise at 35 miles per hour, the tires are placed in an oven at 190° F. for two hours. The tire reinforced with treated cords showed no substantial change in flat-spot performance whereas the one with unwaxed cords shows an increase in flat-spot depth of 30 mils. Thus, an effective moisture barrier, such as a petroleum wax applied as an overlay to the greige cords, assures that a tire's acceptable flat-spot capabilities are retained even after service under severe moisture conditions.

*Example V*

A four-ply tire reinforced with cords fabricated of filaments spun from polyhexamethylene adipamide is built using skim and tread stock in which is dispersed a 3:1 suspension of calcium oxide in "Sundex 41." The skim stock contains 10.1% calcium oxide and the tread stock contains 8.2% calcium oxide. Both the materials and the green tire built therefrom are maintained under conditions of approximately 15% relative humidity at 75° F. The tire is cured in a conventional manner. Its flat-spot depth is 121 mils and, when dissected, the cords are found to contain about 0.1% moisture. A control tire fabricated under similar conditions except for omission of the calcium oxide dispersion exhibits a flat-spot depth of 180 mils.

*Example VI*

A tire is built identical to the test tire of Example V and under similar conditions except that the tire is reinforced with cords fabricated for filaments spun from polycarproamide. This test tire with calcium oxide has a flat spot of 157 mils, and a control tire without calcium oxide has a flat spot of 231 mils.

*Example VII*

A two-ply tire reinforced with 840/3 cords fabricated from filaments spun from an 80/20 melt blend by weight of polyhexamethylene adipamide with polyhexamethylene 5-t-butyl isophthalamide is built using skim stock in which is dispersed about 5% by weight calcium oxide suspended in mineral oil. Both the material and the green tire built therefrom are maintained under conditions of less than 5% relative humidity at 75° F. The tire is cured in a conventional manner. Its flat-spot depth is 106 mils and, when dissected, the cords are found to contain about 0.3% moisture. Similar results are achieved in an otherwise identical test tire reinforced with cords prepared from an 80/20 melt blend by weight of polyhexamethylene adipamide with the copolymer of hexamethylene 5-t-butyl isophthalamide and hexamethylene isophthalamide (3%).

The present invention is directed to the provision of a tire which is reinforced with nylon cords, which tire has acceptable riding characteristics due to its low flat-spot of less than 160 mils, and which cords have a moisture content preferably less than 0.5% by weight. In order to ensure this low moisture content, the tire is fabricated in an atmosphere having a relative humidity at 75° F. of 20% or less. It is well known that the air outside of an industrial plant could be below 20% relative humidity (e.g., on a dry winter day), while the relative humidity (in the manufacturing area) is of the order of 50–80% relative humidity because of leaky steam-pipe connections, open water tanks, and other causes. Therefore, for the purpose of this invention, the atmosphere having a relative humidity at 75° F. of 20% or less is the atmosphere within the room in which tire fabrication is carried out. Of the procedures disclosed herein, the dispersion of calcium oxide in the elastomer stock is of primary importance since it not only affects the initial flat-spotting behavior of tires but also acts as a moisture barrier when the tires are placed in use. In this respect, additional procedures for establishing such a barrier have also been disclosed.

It is apparent that other variations and modifications in the tire and in the procedures followed in its fabrication may be adopted without departing from the spirit of the present invention which is therefore intended to be limited only by the scope of the appended claims.

Having thus described the invention, what is claimed as new and desired to be secured by Letters Patent is:

1. A pneumatic tire provided with an inner liner and at least one ply of substantially dry, parallelized, nylon, reinforcement cords embedded in a skim stock, said liner and said skim stock containing dispersed therein from 3-15% by weight of calcium oxide as a moisture barrier.

2. The tire of claim 1 wherein is provided an additional moisture barrier comprising a wax overlay on each cord.

3. The tire of claim 1 wherein said nylon is a melt blend of distinct polyamides.

4. A pneumatic tire provided with an inner liner and at least one ply of parallelized nylon reinforcement cords having a moisture content of less than 1%, said liner containing dispersed therein from 3-15% by weight of calcium oxide as a moisture barrier.

5. The tire of claim 4 wherein said nylon is a melt blend of distinct polyamides.

6. A pneumatic tire reinforced with at least one ply of parallelized, reinforcement cords embedded in a skim stock, said cords having a moisture content of less than 1% and consisting essentially of a melt blend of distinct polyamides, there being a moisture barrier in the form of a wax overlay on each cord.

References Cited by the Examiner
UNITED STATES PATENTS

| | | | |
|---|---|---|---|
| 1,162,479 | 11/1915 | Harris | 156—110 |
| 1,731,247 | 10/1929 | Kuhlke | 156—110 |
| 2,679,088 | 5/1954 | Meherb et al. | |
| 2,839,117 | 6/1958 | Clayton | 152—330 |
| 2,849,415 | 8/1958 | Stott | 260—37 |
| 2,874,747 | 2/1959 | Woodall | 152—354 |
| 3,052,274 | 9/1962 | Lang | 152—354 |

ARTHUR L. LA POINT, *Primary Examiner.*

C. W. HAEFELE, *Assistant Examiner.*